(12) United States Patent
Yasuda

(10) Patent No.: US 12,144,334 B2
(45) Date of Patent: Nov. 19, 2024

(54) FISHING INFORMATION MANAGEMENT SYSTEM

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 17/197,331

(22) Filed: Mar. 10, 2021

(65) Prior Publication Data

US 2022/0061293 A1 Mar. 3, 2022

(30) Foreign Application Priority Data

Aug. 27, 2020 (JP) .................. 2020-143235

(51) Int. Cl.
*A01K 97/12* (2006.01)
*A01K 97/00* (2006.01)
*H04L 67/12* (2022.01)

(52) U.S. Cl.
CPC ............ *A01K 97/125* (2013.01); *A01K 97/00* (2013.01); *H04L 67/12* (2013.01)

(58) Field of Classification Search
CPC ...... A01K 97/125; A01K 97/12; A01K 97/00; A01K 99/00; A01K 89/012; A01K 89/017; A01K 89/0183
USPC ........ 43/17, 4; 242/370, 223, 225, 250, 390, 242/390.1, 390.2, 390.6
See application file for complete search history.

(56) References Cited

U.S. PATENT DOCUMENTS

| 4,713,967 | A | * | 12/1987 | Overs | G01K 1/024 374/E1.004 |
| 4,746,253 | A | * | 5/1988 | Simmons | A01K 97/12 43/25 |
| 5,511,335 | A | * | 4/1996 | Langer | A01K 97/00 43/17.1 |
| 5,546,695 | A | * | 8/1996 | Langer | A01K 97/00 87/7 |

(Continued)

FOREIGN PATENT DOCUMENTS

| CN | 105519232 A | | 4/2016 |
| JP | 2005071007 A | * | 3/2005 |

(Continued)

OTHER PUBLICATIONS

Office Action for related Chinese Application No. 202110244937.3; action dated Oct. 21, 2022; (17 pages).

(Continued)

*Primary Examiner* — Darren W Ark
*Assistant Examiner* — Kevin M Dennis
(74) *Attorney, Agent, or Firm* — Oliff PLC

(57) ABSTRACT

A fishing information management system includes a fishing reel and an external information communication terminal capable of communicating with the fishing reel, transmits casting information from the fishing reel to the external information communication terminal each time a cast is performed, and is configured to stop the transmission of the casting information on the last cast but one, and to transmit at least part of the casting information on the last cast, when the casting information on the last cast but one is not transmitted or has not been completely transmitted to the external information communication terminal upon the ending of the last cast.

10 Claims, 4 Drawing Sheets

(56) References Cited

U.S. PATENT DOCUMENTS

| | | | | |
|---|---|---|---|---|
| 5,581,930 | A * | 12/1996 | Langer | A01K 97/00 43/17 |
| 5,782,033 | A * | 7/1998 | Park | A01K 97/125 43/17 |
| 6,070,129 | A * | 5/2000 | Grouffal | G01V 1/22 702/32 |
| 7,461,805 | B2 * | 12/2008 | Ikuta | A01K 89/015 242/223 |
| 7,523,882 | B2 * | 4/2009 | Priednieks | A01K 89/0108 242/231 |
| 7,559,499 | B2 * | 7/2009 | Nakagawa | A01K 89/00 242/246 |
| 7,905,440 | B2 * | 3/2011 | Ikuta | A01K 91/20 33/732 |
| 9,439,411 | B2 * | 9/2016 | Bailey | A01K 79/00 |
| 9,585,375 | B2 * | 3/2017 | Miyamae | H04M 1/72415 |
| 9,968,078 | B2 * | 5/2018 | Worley, III | H04L 67/12 |
| 10,223,937 | B2 * | 3/2019 | Pacchione | G09B 5/125 |
| 10,360,560 | B2 * | 7/2019 | Bryant | G06Q 20/4014 |
| 10,478,727 | B2 * | 11/2019 | Blackadar | A01K 99/00 |
| 10,805,927 | B2 * | 10/2020 | Han | H04W 28/02 |
| 2005/0218256 | A1 | 10/2005 | Kuta et al. | |
| 2007/0058489 | A1 * | 3/2007 | Bratcher | A01K 85/00 367/111 |
| 2008/0016749 | A1 * | 1/2008 | Priednieks | A01K 91/20 340/573.2 |
| 2009/0050725 | A1 | 2/2009 | Kuta et al. | |
| 2014/0071167 | A1 * | 3/2014 | Lauenstein | G06T 11/206 345/440 |
| 2014/0247740 | A1 * | 9/2014 | Koo | H04W 16/14 370/252 |
| 2014/0358483 | A1 * | 12/2014 | da Rosa | G01D 9/28 702/188 |
| 2016/0100044 | A1 * | 4/2016 | Miyamae | H04W 76/14 455/420 |
| 2016/0291918 | A1 * | 10/2016 | Nagano | G06F 3/1446 |
| 2017/0142730 | A1 * | 5/2017 | Han | H04L 5/0044 |
| 2018/0295826 | A1 * | 10/2018 | Blackadar | A63F 13/46 |
| 2018/0295827 | A1 * | 10/2018 | Blackadar | G05B 15/02 |
| 2018/0295828 | A1 * | 10/2018 | Blackadar | H04L 67/12 |
| 2018/0295829 | A1 * | 10/2018 | Blackadar | G06N 5/04 |
| 2018/0338485 | A1 * | 11/2018 | Blackadar | A01K 99/00 |
| 2018/0338486 | A1 * | 11/2018 | Blackadar | A63F 13/46 |
| 2018/0361239 | A1 * | 12/2018 | Blackadar | A01K 99/00 |
| 2020/0137995 | A1 | 5/2020 | Ikebukuro | |

FOREIGN PATENT DOCUMENTS

| | | |
|---|---|---|
| JP | 2005218312 A | 8/2005 |
| JP | 2006-42607 | 2/2006 |
| JP | 2020068736 A | 5/2020 |
| WO | 2016015346 A1 | 2/2016 |

OTHER PUBLICATIONS

Office Action for related Chinese Application No. 202110244937.3; action dated Jun. 1, 2023; (13 pages).

Korean Office Action in connection with related Korean Patent Application No. 10-2021-0024791; action dated Feb. 3, 2023; (9 pages).

Office Action for related Japanese Application No. 2020-143235; action dated Jun. 27, 2023; (9 pages).

Office Action for related Korean Application No. 10-2021-0024791; action mailed on Aug. 7, 2023; (8 pages).

Oct. 1, 2024 Office Action issued in Japanese Patent Application No. 2023-192722.

* cited by examiner

Immediately after casting

- Flying distance
- Number of castings
- (Maximum rotation speed)
- (Date and time)

FISHING INFORMATION MANAGEMENT SYSTEM

TECHNICAL FIELD

This disclosure relates to a fishing information management system capable of transmitting various fishing information such as casting information from a fishing reel to the outside.

BACKGROUND

Generally, when fishing for deep-field fish such as in boat fishing, an electric fishing reel ("fishing reel") has been widely used.

Conventionally, that type of fishing reel is provided with a line-length measuring device that measures the length of a wound or unwound fishing line based on the rotation speed of a spool to improve the catch by accurately adjusting the fishing depth, and the values measured by the line-length measuring device appear on an indicator provided on the reel body.

As such a fishing reel, Japanese Patent Application Publication No. 2006-42607 discloses a fishing reel including a spool rotatably supported by the side plates of the reel body therebetween, a winding speed detection means that detects the winding speed during the winding operation of a fishing line wound on the spool, and an indicator that displays the values detected by the winding speed detection means.

However, in the fishing reel disclosed in Japanese Patent Application Publication No. 2006-42607, detection values of winding speed are displayed on an indicator provided on the reel body, but are not intended to be transmitted to the outside. On the other hand, when fishing information such as casting information is transmittable from a fishing reel to the outside and available to the outside, it may be difficult to transmit the information from the fishing reel in a timely and reliable manner depending on the capacity of the transmitted data. Therefore, it is possible that a user cannot display the fishing information on an external terminal when needed, which has posed a problem of significant reduction in user satisfaction.

It could therefore be helpful to provide a fishing information management system capable of transmitting essential part of fishing information from a fishing reel to the outside in a timely and reliable manner.

SUMMARY

I thus provide:

A fishing information management system includes a fishing reel and an external information communication terminal capable of communicating with the fishing reel, is such that casting information is transmitted to the external information communication terminal from the fishing reel each time a casting is performed, and is configured to stop the transmission of the casting information on the last casting but one, and to transmit at least part of the casting information on the last casting, when the casting information on the last casting but one is not transmitted or has not been completely transmitted to the external information communication terminal upon the ending of the last casting.

The fishing information management system may be configured such that the casting information on the last casting includes at least one of the number of castings, the date and time of casting, the spool rotation start point, the spool rotation end point, the dimensions of a fishing line, the spool diameter, the maximum spool rotation speed, the spool rotation speed history, the brake setting, the motion of a fishing rod and the casting method.

The fishing information management system may be configured such that part of the casting information on the last casting is at least one of the number of castings, the date and time of casting, the spool rotation start point, the spool rotation end point, the dimensions of a fishing line, the spool diameter, and the maximum spool rotation speed, when the casting information on the last casting but one is not transmitted or has not been completely transmitted to the external information communication terminal upon the ending of the last casting.

The fishing information management system may be configured to transmit at least part of the casting information on the last casting ahead of the rest of the casting information on the last casting, when casting information is transmitted from the fishing reel to the external information communication terminal a plurality of times each time a casting is performed.

The fishing information management system may be configured to transmit the number of castings, the date and time of casting, the spool rotation start point, the spool rotation end point, the dimensions of a fishing line, the spool diameter, or the maximum spool rotation speed of the casting information on the last casting ahead of the spool rotation speed history, the brake setting, the motion of the fishing rod or the casting method of the casting information on the last casting, when casting information is transmitted from the fishing reel to the external information communication terminal a plurality of times each time a casting is performed.

The fishing reel may be configured to calculate the flying distance of a fishing line cast from the spool rotation start point, the spool rotation end point, the dimensions of a fishing line, and the spool diameter of the casting information, and to transmit the flying distance of the fishing line as casting information from the fishing reel to the external information communication terminal each time a casting is performed.

The fishing information management system may be configured such that the fishing reel and the external information communication terminal communicate via BLE.

The external information communication terminal may be configured to be a smartphone.

The external information communication terminal may be configured to be a wearable terminal.

The fishing information management system may be configured to transmit the casting information for each casting from the fishing reel to the first external information communication terminal and then, from the first external information communication terminal to the second external information communication terminal, when there are a plurality of the external information communication terminals.

The fishing information management system may be configured such that the first external information communication terminal is a smartphone, and the second external information communication terminal is a wearable terminal.

The wearable terminal may include a smartwatch, smart glasses, or headset.

It is thus possible to provide a fishing information management system capable of transmitting essential part of fishing information from a fishing reel to the outside in a timely and reliable manner.

DESCRIPTION OF THE NUMERICAL REFERENCES

Figure 1:
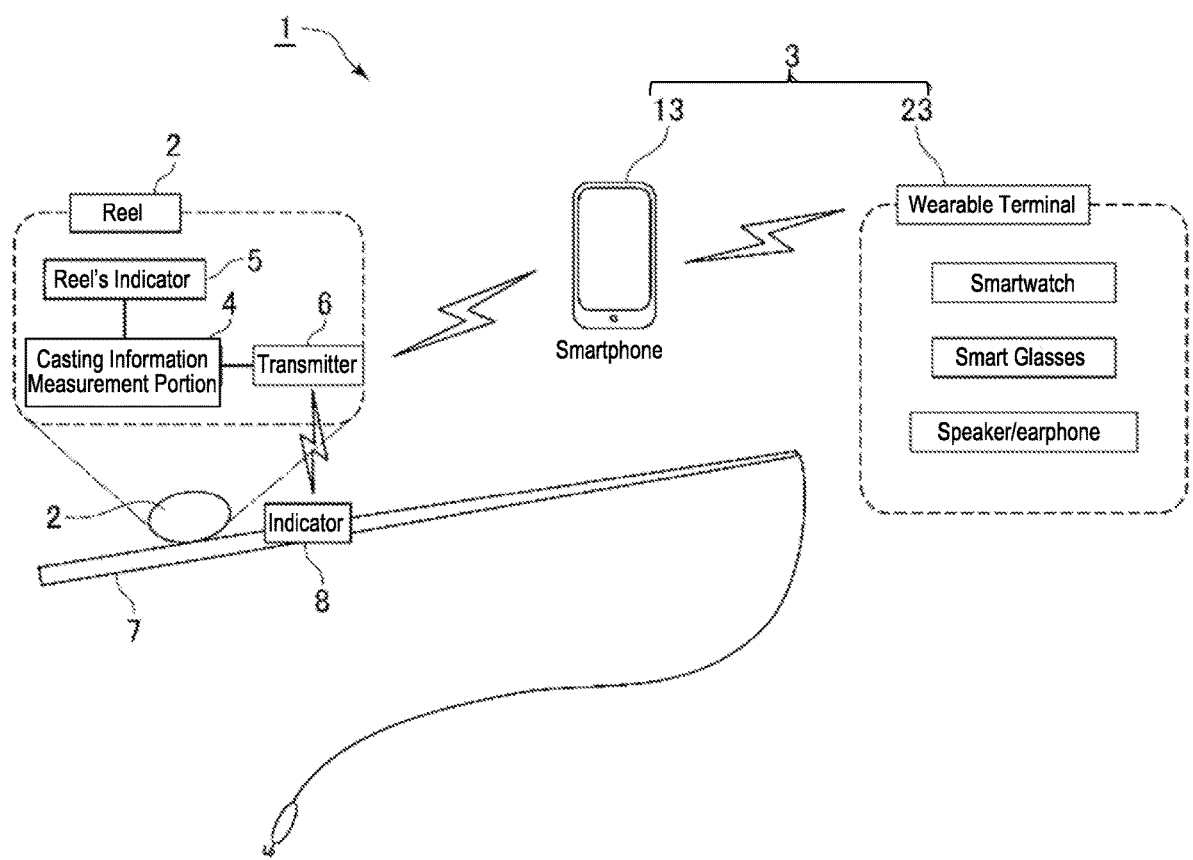
FIG. 1 is a diagram illustrating a fishing information management system according to an example.

1 Fishing information management system
2 Fishing reel
3 External information communication terminal
4 Casting information measurement portion
5 Indicator (reel's indicator)
6 Transmitter
7 Fishing rod
8 Fishing rod indicator
13 Smartphone (mobile phone)
23 Wearable terminal

DETAILED DESCRIPTION

Hereinafter, examples of my systems and methods will be described in detail with reference to the accompanying drawings. Components common in the plurality of drawings are denoted by the same reference numerals through the plurality of drawings. Each of the drawings is not necessarily scaled for convenience of explanation.

First, a basic configuration of a fishing information management system according to an example will be described with reference to FIG. 1.

As illustrated, a fishing information management system 1 includes a fishing reel 2 and an external information communication terminal 3 capable of communicating with the fishing reel 2. There are one or more external information communication terminals, and in the illustrated example, a smartphone 13 and a wearable terminal 23 as external information communication terminals have wired or wireless connections to the fishing reel 2.

As shown in FIG. 1, the fishing reel 2 includes a casting information measurement portion (casting information measurement unit) 4, an indicator (indicating unit or indicating portion) 5 capable of displaying casting information, and a transmitter (transmitting unit or transmitting portion) 6 that transmits the casting information to the outside. The casting information of the fishing reel 2 may be configured to be displayed on an indicator 8 of a fishing rod 7. The details of the casting information will be described later.

The fishing information management system 1 is such that casting information is transmitted to the external information communication terminal 3 from the fishing reel 2 each time a casting is performed, and is configured to stop the transmission of the casting information on the last casting but one, and transmit at least part of the casting information on the last casting, when the casting information on the last casting but one is not transmitted or has not been completely transmitted to the external information communication terminal 3 upon the ending of the last casting. Casting includes both casting a fishing line with a lure, a weight, a hook and the like horizontally to a distance, and dropping the same vertically downward toward the sea floor.

The fishing information management system 1 makes it possible to provide a fishing information management system capable of transmitting essential part of fishing information from a fishing reel to the outside in a timely and reliable manner.

The casting information is configured to include at least one of the number of castings, the date and time of casting, the spool rotation start point, the spool rotation end point, the dimensions of a fishing line, the spool diameter, the maximum spool rotation speed, the spool rotation speed history, the brake setting, the motion of a fishing rod, and the casting method.

The fishing information management system 1 may be configured such that part of the casting information on the last casting transmitted to the external information communication terminal 3 includes at least one of the number of castings, the date and time of casting, the spool rotation start point, the spool rotation end point, the dimensions of a fishing line, the spool diameter, and the maximum spool rotation speed, when the casting information on the last casting but one is not transmitted or has not been completely transmitted to the external information communication terminal 3 upon the ending of the last casting.

The fishing information management system 1 may be configured such that casting information is transmitted from the fishing reel 2 to the external information communication terminal 3 a plurality of times each time a casting is performed, in which at least part of the casting information on the last casting is transmitted ahead of the rest of the casting information.

The fishing information management system 1 makes it possible to provide a fishing information management system capable of transmitting essential part of fishing information from a fishing reel to the outside in a timely and reliable manner.

The number of castings, the date and time of casting, the spool rotation start point, the spool rotation end point, the dimensions of a fishing line, the spool diameter, or the maximum spool rotation speed of the casting information on the last casting may first be transmitted, when casting information is transmitted from the fishing reel 2 to the external information communication terminal 3 a plurality of times each time a casting is performed. The information is called the casting flash data. Further, the spool rotation speed history, the brake setting, the motion of the fishing rod or the casting method of the casting information on the last casting may be configured to be transmitted later. The information is called the detailed casting data.

The external information communication terminal 3 can be configured to calculate the flying distance of a fishing line cast from the spool rotation start point, the spool rotation end point, the dimensions of the fishing line, and the spool diameter of the below information received, when receiving the number of castings, the date and time of casting, the spool rotation start point, the spool rotation end point, the dimensions of a fishing line, the spool diameter, or the maximum spool rotation speed from the fishing reel 2. In this manner, the level of user satisfaction with fishing can be further improved by first displaying, on the external information communication terminal 3, the information on the number of castings, the date and time of casting, the maximum spool rotation speed, and the flying distance of a fishing line that a user wants to immediately check each time a casting is performed.

Further, the fishing reel 2 can be configured to calculate the flying distance of a fishing line cast from the spool rotation start point, the spool rotation end point, the dimensions of the fishing line, and the spool diameter of the casting information. In this manner, the fishing reel 2 can transmit the flying distance of the fishing line as casting information to the external information communication terminal 3 each time a casting is performed.

The fishing reel 2 and the external information communication terminal 3 may be configured to communicate via BLE. This is because the fishing reel and the external information communication terminal have excellent compatibility with each other in terms of, for instance, low power consumption, compatibility with other devices, and ease of pairing. Other possible transmission methods include, but are not limited to, infrared communication such as IrDA, Bluetooth communication other than BLE, wireless LAN communication such as WiFi, and Near Field Communication such as NFC.

The external information communication terminal 3 may be configured to be the smartphone (mobile phone) 13.

The external information communication terminal may be configured to be the wearable terminal 23. The wearable terminal includes, but is not limited to, a smartwatch, wristband wearable terminal, clip-on wearable terminal, smart glasses, and headset such as earphone.

The fishing information management system 1 may be configured to transmit the casting information for each casting from the fishing reel 2 to the first external information communication terminal and then, from the first external information communication terminal to the second external information communication terminal, when there are a plurality of the external information communication terminals. The data communication speed is slow for a low-power consumption communication method suitable for use in fishing tools such as BLE. Further, the wireless communication during fishing may be interrupted due to, for instance, power shortage, radio interference arising from rain, water splash or the like, and other tasks processed by an external device.

Accordingly, when data is communicated in the order of casting, a large time lag arises between the end of casting and the transmission of casting information to a user, which may cause a feeling of discomfort. If the time lag becomes even larger, and the user performs the next casting before receiving the casting information, the user will receive the previous casting information, which may confuse the user. On the other hand, even when any casting information remains untransmitted as in the examples, the time lag until the user receives the casting information becomes shorter by transmitting the last casting information immediately following the end of casting, whereby the above problem can be avoided.

The fishing information management system 1 may be configured such that the first external information communication terminal is a smartphone, and the second external information communication terminal is a wearable terminal. A smartphone has greater computing power and information storage capacity, and generally has larger display screen, than a wearable terminal, thereby being able to receive, store and display more data. However, it is necessary to use both hands (at least one hand) for operation and browsing. Further, it is difficult to operate a smartphone while fishing since many models are not waterproofed in general. On the other hand, a wearable terminal such as a smartwatch worn on a wrist, smart glasses worn on eyes, and earphone worn inside ears has the advantage that both hands are free when in use. Therefore, it is suitable for communicating information to a user even during fishing.

A large amount of data can be stored without sacrificing the information storage capacity of a wearable terminal by transmitting detailed casting data with a relatively large amount of information to a smartphone. Further, it is possible to convey information to a user as necessary even during fishing by transmitting casting flash data to a wearable terminal. The casting flash data may be directly transmitted from a reel to the wearable terminal, or may be transmitted from the reel to the smartphone, and then to the wearable terminal after arithmetic processing is performed by the smartphone as necessary.

Next, an example of transmitting casting information for each casting from the fishing reel 2 to the external information communication terminal 3 will be described in detail with reference to FIG. 2. In the illustrated example, the fifteenth casting was completed, and the latest casting information and the casting information up to the fourteenth casting were already detected. On the other hand, it is illustrated that though each casting information was sequentially transmitted to the external information communication terminal 3, casting information up to the eleventh casting was received, the transmission of the twelfth casting information was interrupted, and the communication reconnected after the fifteenth casting.

In such a configuration, it is usually supposed that the fifteenth casting information is transmitted following the transmission of the thirteenth and fourteenth casting information after the reconnection. However, since a user wants to first know the latest casting information, in the case of the example in FIG. 2, the most up-to-date casting information can be provided to the user by transmitting the fifteenth casting information before the thirteenth and the fourteenth casting information to the external information communication terminal 3, which further improves the level of user satisfaction with fishing.

Next, casting information displayed on the external information communication terminal 3 in the fishing information management system 1 according to an example will be described with reference to FIG. 3. As illustrated, casting information that a user wants to check in the external information communication terminal 3 immediately after casting includes the number of castings, the date and time of casting, the maximum spool rotation speed, and the flying distance of the fishing line. It is therefore possible to further improve the level of user satisfaction with fishing by giving the user the information described above each time a casting is performed, and displaying the above information on the last casting in the example in FIG. 2. A user's means of checking the information while fishing includes an output means such as LCD embedded in a reel or rod, or the wearable terminal 23 described above. In the case of outputting to a display device such as LCD, it is difficult to have a large display screen due to constraints of tools, and in transmitting as phonetic information by an earphone, a speaker or the like, the time available for transmitting information during fishing is limited. Thus, the information conveyed by the output means while the user is fishing is limited. The user can, receiving the flying distance information immediately after casting, adjust the subsequent winding speed, or change the brake setting and the casting method upon the next casting. Limiting the scope of the information to be transmitted immediately after casting as described above makes it possible to deliver the information to the user as necessary in a timely and appropriate manner.

Figure 4:
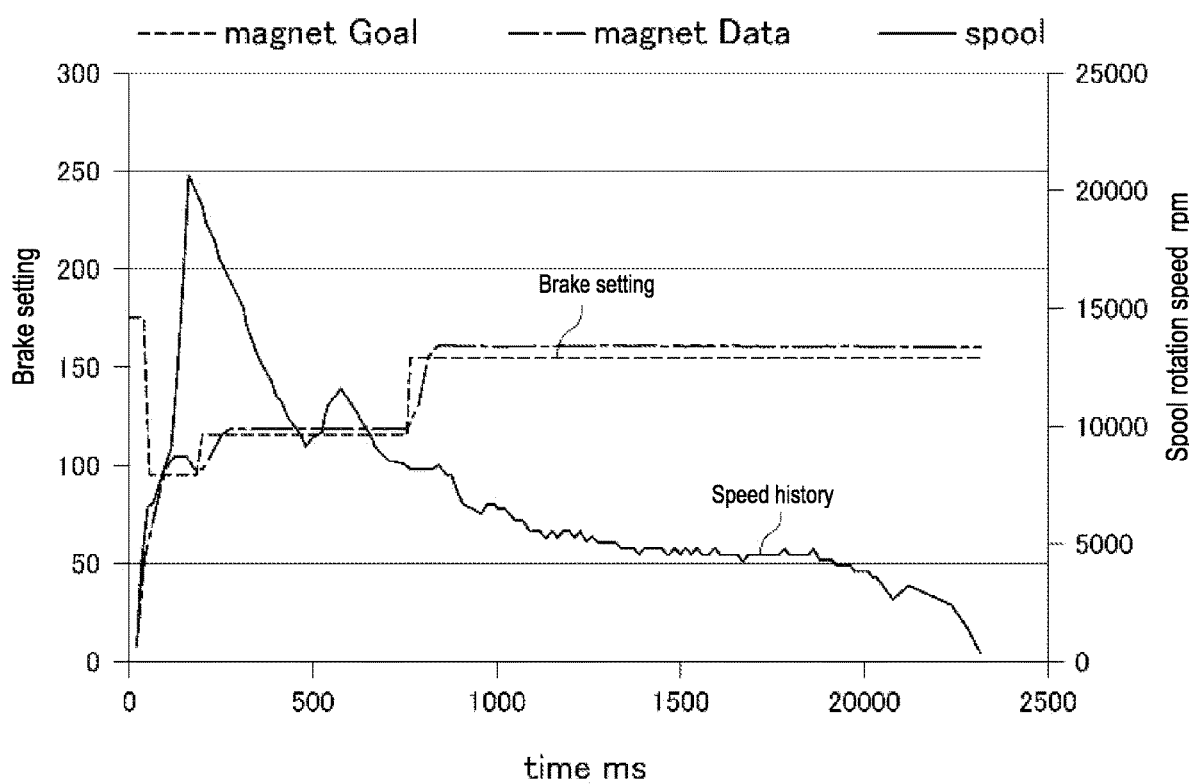
FIG. 4 is a diagram illustrating an example of displaying casting information in a fishing information management system.
Figure 5:
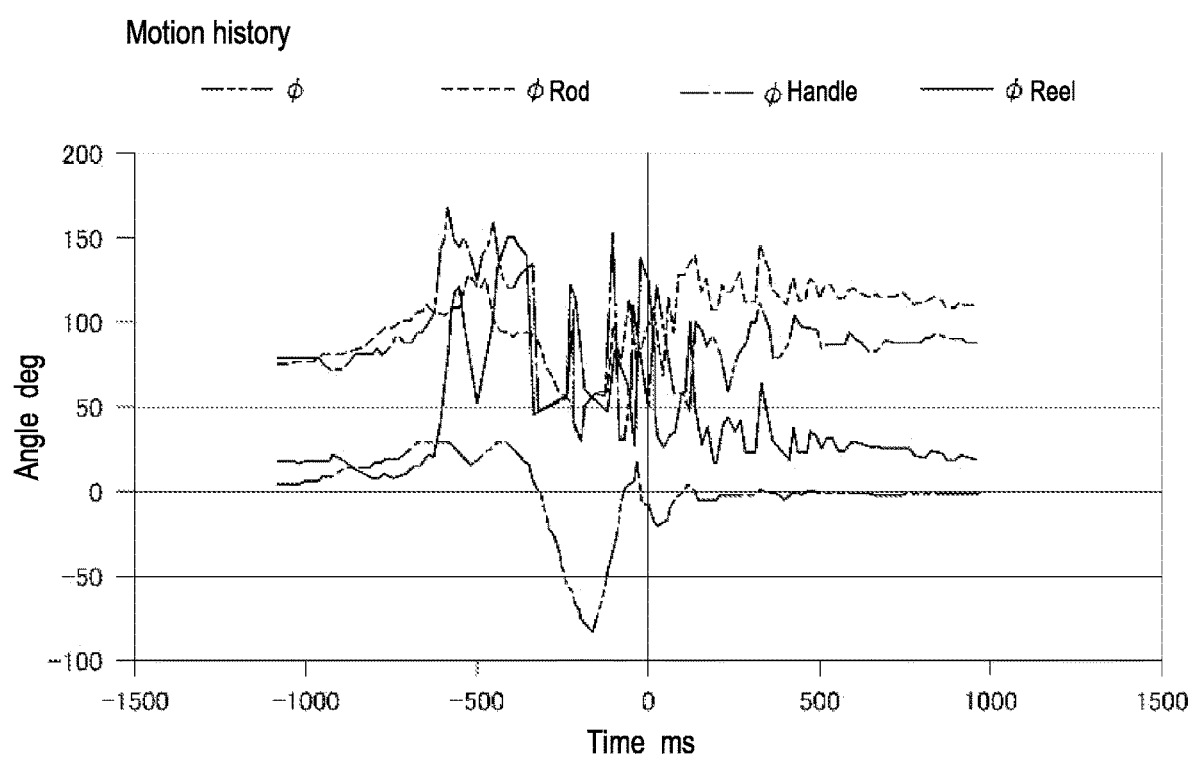
FIG. 5 is a diagram illustrating an example of displaying casting information in a fishing information management system.

Next, casting information displayed on the external information communication terminal 3 in the fishing information management system 1 according to an example will be described with reference to FIGS. 4 and 5. As illustrated, the casting information that a user wants to examine after casting is displayed on the external information communication terminal 3. In FIG. 4, the vertical axis represents time and the horizontal axis represents the speed history of the fishing line and the brake setting. In FIG. 5, the horizontal axis represents time, and the vertical axis represents each angle of the fishing rod, the handle, and the reel. This is the information that the user wants to take time to review after fishing, which can be said to have relatively low urgency as compared to the casting information shown in FIG. 2. It is possible to calculate from the angles in FIG. 5 the casting method, that is, whether it is side casting or overhead casting.

During a break or after fishing, a user can operate output means such as a PC and a smartphone. The output means has a larger display screen than those that can be operated during fishing, and the time the user can spend for the operation or checking is longer than when fishing, whereby more information can be provided. Further, the winding speed history, statistical information, and the like obtained from detailed data are useful for future improvement in the catch. However, the information is not much required to be provided to the user at all times during fishing. It takes time to transmit the detailed data with large information amount than it does to transmit flash data. Therefore, each data can be transmitted when the user wants to know by sending the flash data first and then the detailed data later.

As described above, I found that casting information to be notified to a user can be divided into roughly two types, and that the level of user satisfaction with fishing is further improved by transmitting higher-priority information before the other casting information.

Figure 2:
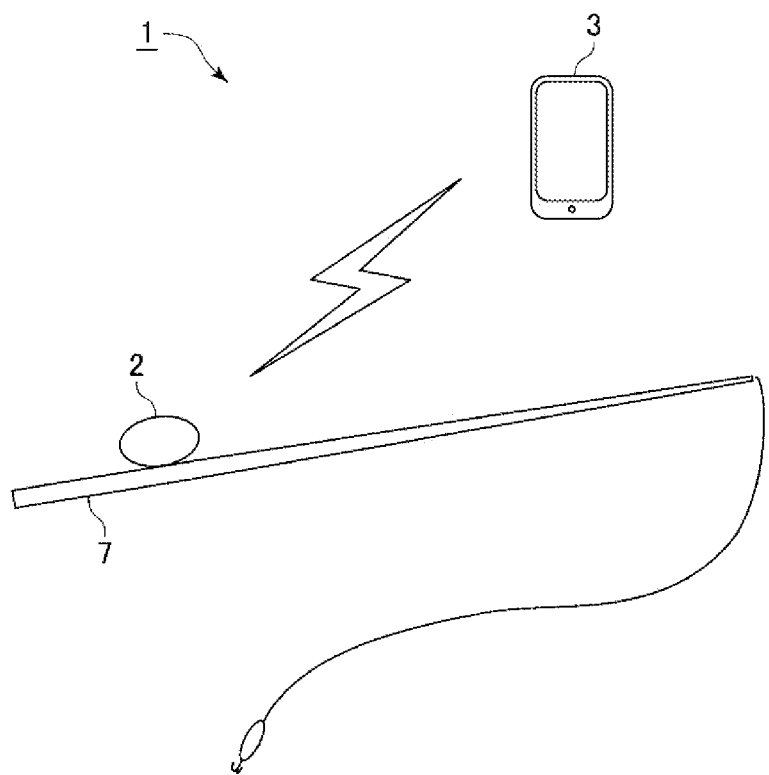
FIG. 2 is a diagram illustrating a method of transmitting casting information in a fishing information management system according to an example.
Figure 3:
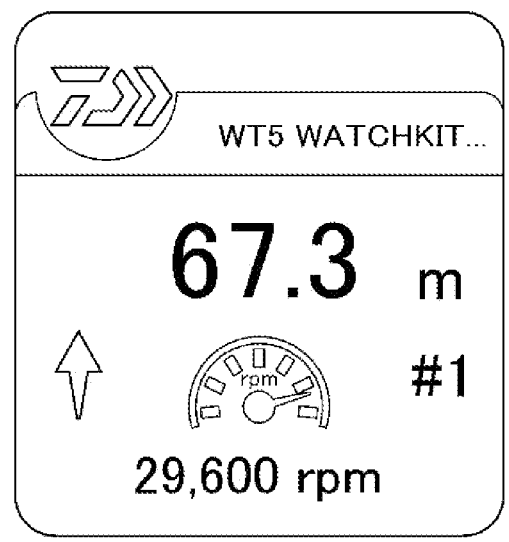
FIG. 3 is a diagram illustrating an example of displaying casting information in a fishing information management system.

Returning to the example in FIG. 2, the most up-to-date casting information can be sent to a user by transmitting the fifteenth casting information first and then, the thirteenth and the fourteenth casting information to the external information communication terminal 3. Therefore, the level of user satisfaction with fishing is further improved by transmitting the fifteenth casting information in which the user is most interested first and then, the rest of the casting information, despite given communication limitations. The thirteenth and the fourteenth casting information may be transmitted in chronological order or in reverse chronological order, after transmission of the fifteenth casting information.

The dimensions, materials and arrangements of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

What is claimed is:

1. A fishing information management system comprising a fishing reel and a first external information communication terminal capable of communicating with the fishing reel, wherein
    casting information is transmitted from a transmitter of the fishing reel to a receiver of the first external information communication terminal each time a cast is performed,
    when a latest cast is finished, if the casting information for a previous cast has begun but has not been completely transmitted to the first external information communication terminal, the system stops transmission of the casting information for the previous cast, and at least part of the casting information on the latest cast is transmitted prior to the casting information for the previous cast,
    a first set of types of data includes a number of casts, a date and time of casting, a spool rotation start point, a spool rotation end point, dimensions of a fishing line, a spool diameter, or a maximum spool rotation speed of the casting information on the latest cast,
    a second set of types of data, having a lower priority than a priority of the first set of types of data, includes a spool rotation speed history, a brake setting, a motion of a fishing rod or a casting method of the casting information on the latest cast, and
    the types of data in the first set have a higher priority than the types of data in the second set and are transmitted before the types of data in the second set when casting information is transmitted from the fishing reel to the first external information communication terminal a plurality of times each time the cast is performed.

2. The fishing information management system according to claim 1, wherein the at least part of the casting information on the latest cast is at least one of the number of casts, the date and time of casting, the spool rotation start point, the spool rotation end point, the dimensions of a fishing line, the spool diameter, and the maximum spool rotation speed, when the casting information on the previous casting has not been completely transmitted to the first external information communication terminal upon the ending of the latest cast.

3. The fishing information management system according to claim 1, wherein the at least part of the casting information on the latest cast is transmitted before a rest of the casting information, when the casting information is transmitted from the fishing reel to the first external information communication terminal a plurality of times each time the cast is performed.

4. The fishing information management system according to claim 1, wherein the fishing reel calculates a flying distance of a fishing line cast from the spool rotation start point, the spool rotation end point, the dimensions of the fishing line, and the spool diameter of the casting information, and transmits the flying distance of the fishing line as the casting information from the fishing reel to the first external information communication terminal each time the cast is performed.

5. The fishing information management system according to claim 1, wherein the fishing reel and the first external information communication terminal communicate via BLE.

6. The fishing information management system according to claim 1, wherein the first external information communication terminal is a smartphone.

7. The fishing information management system according to claim 1, wherein the first external information communication terminal is a wearable terminal.

8. The fishing information management system according to claim 1, wherein the casting information for each cast is transmitted from the fishing reel to the first external information communication terminal and then, from the first external information communication terminal to a second external information communication terminal, when there are a plurality of the external information communication terminals.

9. The fishing information management system according to claim 8, wherein the first external information communication terminal is a smartphone, and the second external information communication terminal is a wearable terminal.

10. The fishing information management system according to claim 7, wherein the wearable terminal includes a smartwatch, smart glasses or headset.

\* \* \* \* \*